United States Patent [19]

Vasishth et al.

[11] 4,045,411

[45] Aug. 30, 1977

[54] MOBILE ROOM-TEMPERATURE STABLE ACID CATALYZED PHENOL FORMALDEHYDE RESIN COMPOSITIONS

[75] Inventors: Ramesh C. Vasishth, Delta; Pitchaiya Chandramouli, Richmond, both of Canada

[73] Assignee: Cor Tech Research Limited, Richmond, Canada

[21] Appl. No.: 567,864

[22] Filed: Apr. 14, 1975

Related U.S. Application Data

[63] Continuation-in-part of Ser. No. 421,068, Dec. 9, 1973, abandoned.

[30] Foreign Application Priority Data

Apr. 17, 1974  United Kingdom ............... 16860/74

[51] Int. Cl.$^2$ .......................... C08G 2/28; C08G 2/30
[52] U.S. Cl. .................................. 260/59 R; 260/52; 260/57 R
[58] Field of Search .................... 260/52, 57 A, 159 R

[56] References Cited

U.S. PATENT DOCUMENTS

| | | | |
|---|---|---|---|
| 3,485,797 | 12/1969 | Robins | 260/57 |
| 3,501,552 | 3/1970 | Robins | 260/52 X |
| 3,535,185 | 10/1970 | Tveten | 260/57 A |

FOREIGN PATENT DOCUMENTS

927,041  5/1973  Canada

*Primary Examiner*—Edward M. Woodberry
*Attorney, Agent, or Firm*—Sim & McBurney

[57] ABSTRACT

Thermosetting phenol-formaldehyde resins having novel structures and properties are described. In one embodiment, there is provided a novel thermosetting phenol-formaldehyde resin having benzyl ether linkages ortho to the phenolic hydroxyl group and characterized by its infra-red spectrum which exhibits absorption at wave numbers of about 1010 cm$^{-1}$, 1060 cm$^{-1}$ and 1230 cm$^{-1}$. The infra-red spectrum has a particular ratio of absorbance at 1010 cm$^{-1}$, measured from a base line drawn between wave numbers of 1030 cm$^{-1}$ and 950 cm$^{-1}$, to that at 1230 cm$^{-1}$, measured from a base line drawn between wave numbers of 1130 cm$^{-1}$ and 1310 cm$^{-1}$ which is less than about 0.1. These novel resins are prepared by the controlled addition of strong acids to thermosetting phenol-formaldehyde resins having the benzyl ether linkages and an infra-red spectrum exhibiting large adsorption at wave numbers of 1230 cm$^{-1}$, 1060 cm$^{-1}$ and 1010 cm$^{-1}$, causing a decrease of at least 35% in the ratio of absorbance at 1010 cm$^{-1}$, measured from a base line drawn between wave numbers of 1030 cm$^{-1}$ and 950 cm$^{-1}$ to that at 1230 cm$^{-1}$, measured from a base line drawn between wave numbers of 1130 cm$^{-1}$ and 1310 cm$^{-1}$, while leaving substantially unaltered the absorbance at wave numbers of 1230 cm$^{-1}$ and 1060 cm$^{-1}$. These novel resins are capable of many applications and are normally tack-free, although the tack may be controlled by the addition of an organic solvent, such as phenol, thereto. In a second embodiment, the resins are formed at a mole ratio of formaldehyde to phenol of above 1.7:1 in an aqueous reaction medium. The resins form acid-catalyzed, room-temperature stable and mobile resins which may be applied as a one component curable system onto substrates for the formation of molded articles, such as rice husk boards.

5 Claims, 22 Drawing Figures

MOBILE ROOM-TEMPERATURE STABLE ACID CATALYZED PHENOL FORMALDEHYDE RESIN COMPOSITIONS

REFERENCE TO RELATED APPLICATION

This application is a continuation-in-part of our co-pending application Ser. No. 421,068 filed Dec. 9, 1973 (now abandoned).

FIELD OF INVENTION

The present invention is directed to novel phenol-formaldehyde thermosetting resins, their preparation and uses.

BACKGROUND TO THE INVENTION

In Canadian Pat. No. 927,041 there is described the preparation of phenol-formaldehyde resins from mole ratios of formaldehyde to phenol greater than 1:1 by a two-step procedure in an aqueous reaction medium containing a metal carboxylate catalyst therefor. In the first exothermic step, the reaction mixture is maintained at a temperature of about 60° to about 80° C, and in the second step a temperature of 90° to 100° C is used, typically about 90° C. While the procedure outlined in this prior art is said to be applicable to a wide range of mole ratios of formaldehyde to phenol of from 1:1 to 3:1, the specific example thereof is limited to a mole ratio of 1.5:1.

The resins produced by the two-step procedure of this prior art typically have a low viscosity at room temperature and are unsuitable for many adhesive applications, such as rice husk board manufacture. By prolonging the cooking procedure of the second stage of the resin-forming process, it is possible to provide a resin of high viscosity at room temperature (greater than about 50,000 cps at 75° F) which is suitable for rice husk board manufacture, as described in more detail in our U.S. Pat. No. 3,850,677.

The high viscosity resins provided by this modification of the procedure of Canadian Pat. No. 927,041 require heating to decrease their viscosity for application to the substrate. Acids typically are used to accelerate the rate of cure of the resins. However, the resins cure rapidly in the presence of acid at the elevated temperatures required for application to the substrate, leading to separate application of resin and acid to the substrate.

This mode of application is haphazard at best since proper contact of acid and resin on the substrate surface is by no means assured, and this leads to the use of greater quantities of acid than otherwise would be required, resulting in uneconomic chemical use and often impaired product appearance.

In Canadian Pat. No. 927,041, the resin produced by the procedure described therein is described as containing a preponderance of benzyl ether linkages between phenolic rings, mainly at ortho positions relative to the phenolic hydroxyl group and exhibiting a characteristic infra-red spectrum exhibiting large absorption at wave numbers of 1230 cm$^{-1}$, 1050 cm$^{-1}$ (1060 cm$^{-1}$) and 1010 cm$^{-1}$, and are reported to possess very long shelf lives at room temperature.

A further prior art patent, U.S. Pat. No. 3,485,797, describes the preparation of phenol-formaldehyde resins by a procedure involving anhydrous conditions using para-formaldehyde and phenol and water-immiscible solvents such as toluene to remove the water of condensation. This procedure uses relatively expensive catalysts.

In both pieces of prior art, the addition of acid to the resin is described for the purpose of accelerating cure of the resin.

SUMMARY OF INVENTION

It has now surprisingly been found that a novel room-temperature stable thermosetting phenol-formaldehyde resin may be formed and isolated by the controlled addition of small quantities of at least one strong acid to the high viscosity resin produced by the procedure of Canadian Pat. No. 927,041. In accordance with one embodiment of the present invention, there is provided a novel relatively stable phenol-formaldehyde resin containing benzyl ether linkages ortho to the phenolic hydroxyl group characterized by an infra-red spectrum which displays high absorption peaks at wave numbers of 1060 cm$^{-1}$ and 1230 cm$^{-1}$, the ratio of absorbance at 1010 cm$^{-1}$, measured from a base line drawn between wave numbers of 1030 cm$^{-1}$ and 950 cm$^{-1}$, to that at 1230 cm$^{-1}$, measured from a base line drawn between wave numbers of 1130 cm$^{-1}$ and 1310 cm$^{-1}$, which is less than 0.1.

It has also been surprisingly found that the properties and structure of the resins vary with mole ratio of formaldehyde to phenol. Thus, under the same conditions of formation, the resin viscosity decreases as the formaldehyde to phenol mole ratio increases and the resins cure rapidly at high temperatures of about 200° C. However, the stability of the resins, after addition of catalyzing amounts of acid, at room or near ambient temperatures of about 20° to 25° C, increases with increasing formaldehyde to phenol mole ratio. In accordance with the second embodiment of the invention, resins are provided at a mole ratio of formaldehyde to phenol greater than about 1.7:1, and such resins have unique properties and charactistic infra-red spectra not exhibited by resins formed from mole ratios of formaldehyde to phenol of less than about 1.7:1. Thus, while the resins all have high absorbance at a wave number of 1230 cm$^{-1}$ irrespective of the mole ratio, the resins formed from a greater than 1.7:1 mole ratio exhibit a strong absorption at a wave number of 1030 cm$^{-1}$, a peak which is absent from the spectra of resins formed from less than 1.7:1 mole ratios. In the spectra of these novel resins, the ratio of absorbance at a wave number of 1030 cm$^{-1}$, measured from a base line drawn between wave numbers of 1130 cm$^{-1}$ and 950 cm$^{-1}$, to that at a wave number of 1230 cm$^{-1}$, measured from a baseline drawn between wave numbers of 1130 cm$^{-1}$ and 1310 cm$^{-1}$, is greater than 0.6.

The latter novel resins exhibit properties as enumerated in more detail below, which lead to novel, unexpected and advantageous uses for resins formed from mole ratios of formaldehyde to phenol greater than about 1.7:1. One such property is the ability to provide an acid catalyzed resin which is capable of room temperature application and is an effective adhesive

BRIEF DESCRIPTION OF DRAWINGS

FIGS. 5 to 17 are infra-red spectra of a number of thermosetting phenol-formaldehyde resins prepared at different mole ratios.

GENERAL DESCRIPTION OF INVENTION

The thermosetting phenol-formaldehyde resins provided by the first embodiment of the present invention may be formed by the controlled addition of acid to a high viscosity phenol-formaldehyde resin formed by the procedure disclosed in Canadian Pat. No. 927,041, typically at a mole ratio of formaldehyde to phenol of about 1.5 to 1.6:1.

When the acid is added to the resin at room temperature, a chemical reaction occurs which leads to an entirely new resin, as evidenced by its characteristic infra-red spectrum, which may be isolated and is stable at room temperature. The latter resin is rapidly curable to a thermoset state by the use of heat and/or additional quantities of acid, preferably under pressure. The cure times required for the resins provided in this manner from those of Canadian Pat. No. 927,041 are much shorter than the corresponding resins of Canadian Pat. No. 927,041 and the cure times may be decreased further by addition of catalyzing quantities of acid to the novel resin prior to curing.

A wide range of organic and inorganic acids may be employed and include aryl sulfonic acids, such as benzene sulfonic acid and toluene sulfonic acid and inorganic acids such as phosphoric acid, sulfuric acid, together with mixtures of two or more of such acids. A wide range of acid quantities may be employed, depending on the strength of the acid and the temperature employed, for example, for toluene sulfonic acid, the quantity of acid may vary from about 0.25 to about 1.5%, preferably about 0.5 to about 1% by weight of the resin at room temperature.

The changes which occur upon addition of acid to a high viscosity phenol-formaldehyde resin prepared in accordance with the procedure of Canadian Pat. No. 927,041 is illustrated by the following observations. To a high viscosity resin made according to the procedure of Canadian Pat. No. 927,041 from 1 mole of phenol and 1.6 moles of formaldehyde was added 1% by weight of the resin of para-toluene sulfonic acid used as a 50% aqueous solution therof. The mixture was maintained at a room temperature of about 70° F and samples were withdrawn 5 minutes and 2¼ hours after acid addition and their infra-red spectra obtained. The three spectra obtained are shown in FIG. 1.

Figure 1A:
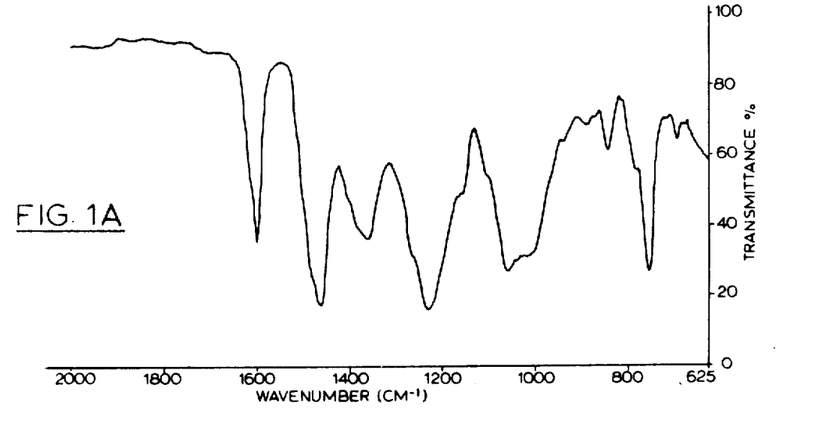
FIGS. 1A, 1B and 1C show infra-red spectra of changes in absorption with time upon addition of acid to phenol-formaldehyde resin containing benzyl ether linkages ortho to the phenolic hydroxyl group and prepared in accordance with Canadian Pat. No. 927,041.
Figure 1B:
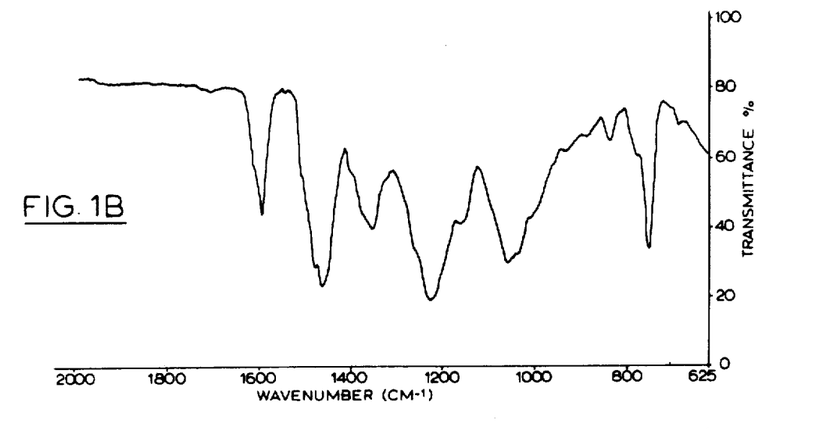
Figure 1C:
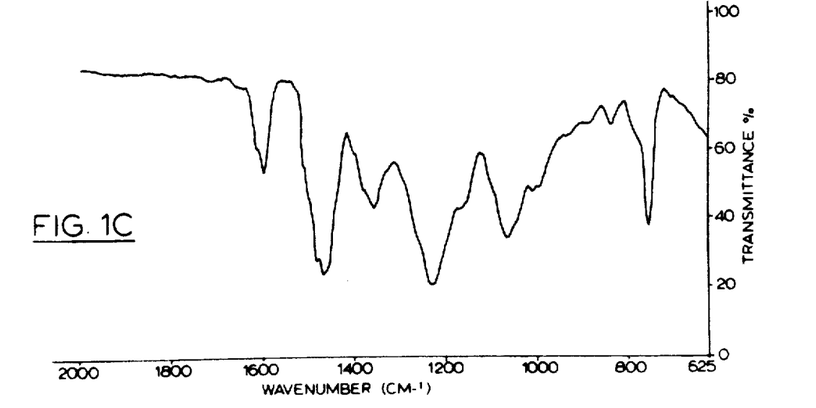

A study of infra-red spectra of FIG. 1 shows that the initially-formed high viscosity resin exhibits large absorption peaks at about 1010 cm$^{-1}$, 1060 cm$^{-1}$ and 1230 cm$^{-1}$ and, upon addition of acid, that there is an almost instant decrease in the absorbance at 1010 cm$^{-1}$. It was observed that this is accompanied by some formaldehyde evolution. This instant decrease in the absorbance value at 1010 cm$^{-1}$ may be attributed to either the cross-linking of any residual terminal methylol groups or to the breakdown of hemi-formal side chains. Since methylol groups are not likely to react instantly on addition of such small, quantities of acid as 0.5 to 1% para-toluene sulfonic acid at room temperature, the sudden decrease of absorbance at 1010 cm$^{-1}$ must be attributed to some reaction other than methylol condensation.

The resins prior to acid addition, therefore, most likely have benzyl ether linkages ortho to the phenolic hydroxyl group and benzyl hemi-formal chains as indicated by the following formula:

wherein $m$ and $n$ are numbers the sum of which is at least two and the ratio of $m$ to $n$ is greater than one and A is —CH$_2$— O CH$_2$— OH, —CH$_2$OH or hydrogen, where x is an integer, at least some of the A groups being —CH$_2$—[OCH$_2$]$_x$—OH.

On the addition of acid to such resins, the hemi-formal end groups will yield a methylol group, simultaneously releasing the formaldehyde tied up in the side chain, thereby accounting for the observation of the release of formaldehyde upon addition of the acid.

It is possible that some of the end groups —A are simple methylols and others are benzyl hemi-formals. On acid addition at room temperatures in concentrations as low as 0.5% of toluene sulfonic acid of the weight of the resin, the immediate primary reaction, however, would involve the breakdown of the hemi-formals, with formaldehyde release.

Since formaldehyde is released upon acid addition and in view of the lower pH conditions prevailing, other side reactions in all likelihood take place. Thus, at least some of the formaldehyde released probably reacts into the resin structure or reacts with any free phenol present. The IR spectra in FIG. 1 also show that there is a decrease in the absorbance at 690 cm$^{-1}$ upon addition of acid indicating a decrease in the concentration of free phenol present in the resin. Probably there is also a decrease in the concentration of other monomeric methylol phenols present.

A further examination of the IR spectra of the acid modified resin as shown in FIG. 1 shows that there is substantially no decrease in the absorbance at 1230 cm$^{-1}$ and 1060 cm$^{-1}$. This absorbance is attributed to the dibenzyl ether groups.

It is, therefore, concluded that the dibenzyl ether groups are not affected by acid addition at room temperature. In the light of the IR data presented in FIG. 1 and the foregoing discussion, it is evident that a new thermosetting phenol formaldehyde resin containing benzyl ether linkages ortho to the phenol hydroxyl group, which exhibits substantially less absorption at 1010 cm$^{-1}$ in the IR spectrum as compared to the resin before acid addition, typically exhibiting, during the acid addition step, a decrease in ratio of absorbance at 1010 cm$^{-1}$ measured from a base line drawn between wave numbers of 1030 cm$^{-1}$ and 950 cm$^{-1}$, to that at 1230 cm$^{-1}$ measured from a base line drawn between wave numbers of 1130 cm$^{-1}$ and 1310 cm$^{-1}$ of at least 35%, preferably about 60 to about 95%. In the novel resin, the ratio is less than about 0.1, typically less than about 0.07. Thus, the new resin is chemically different from the high viscosity resin produced by using the procedure of Canadian Pat. No. 927,041.

The new resin prepared by this procedure, has a lower content of small molecular weight compounds and a somewhat higher average molecular weight. It is also chemically different, in that the benzyl hemi-formals have been replaced by methylol groups.

Figure 2A:
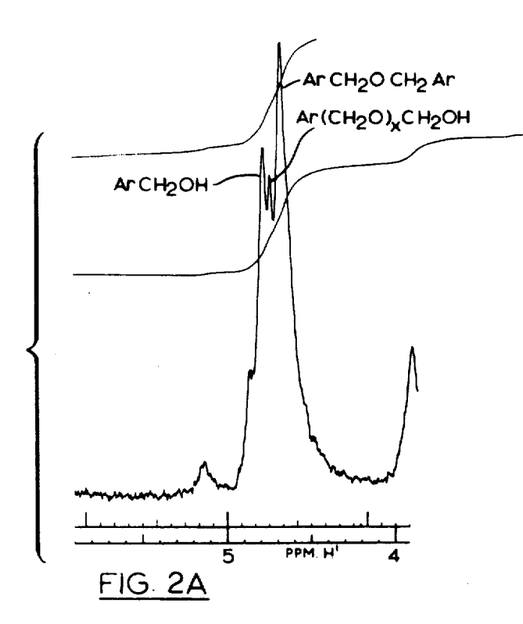
FIGS. 2A, 2B and 2C are nuclear magnetic spectra showing changes in absorption with time upon addition of acid to a phenol-formaldehyde resin containing predominantly benzyl ether linkages and prepared in accordance with the above-described modification of the procedure of Canadian Pat. No. 927,041.
Figure 2B:
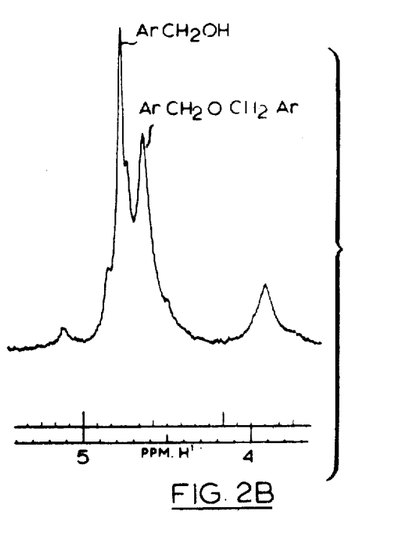
Figure 2C:
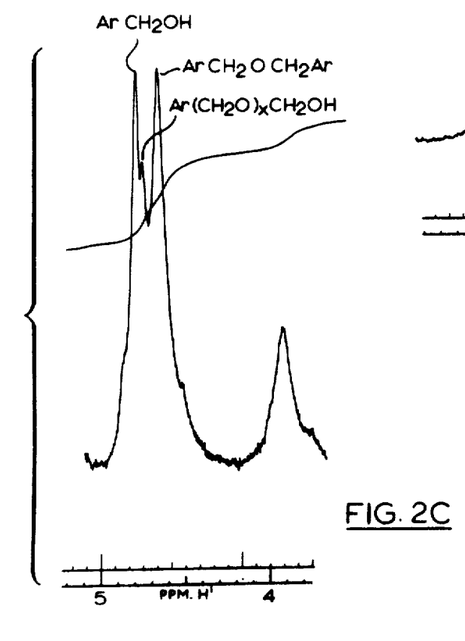
Figure 3A:
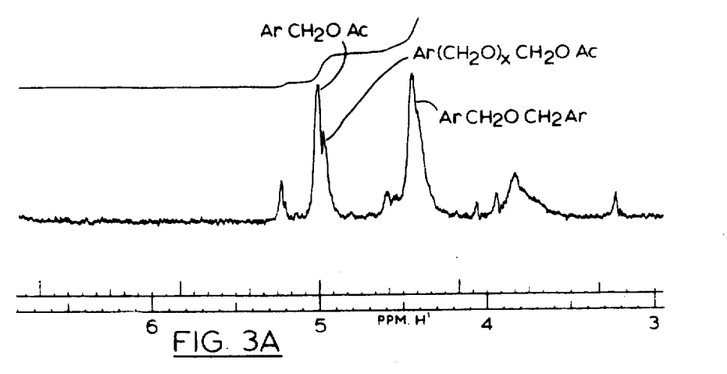
FIGS. 3A, 3B and 3C are nuclear magnetic spectra similar to FIGS. 2A, 2B and 2C with the exception that the resins are in an acetylated form.
Figure 3B:
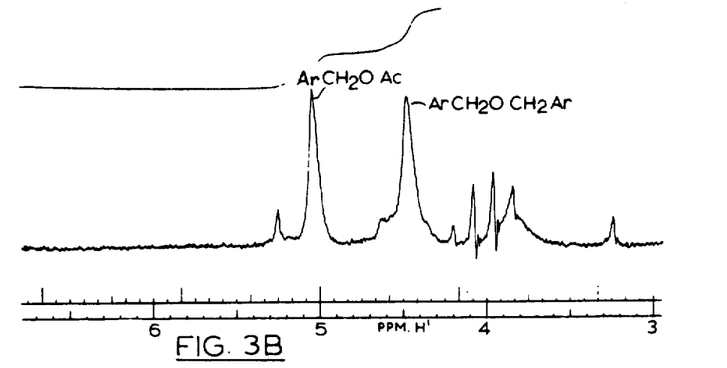
Figure 3C:
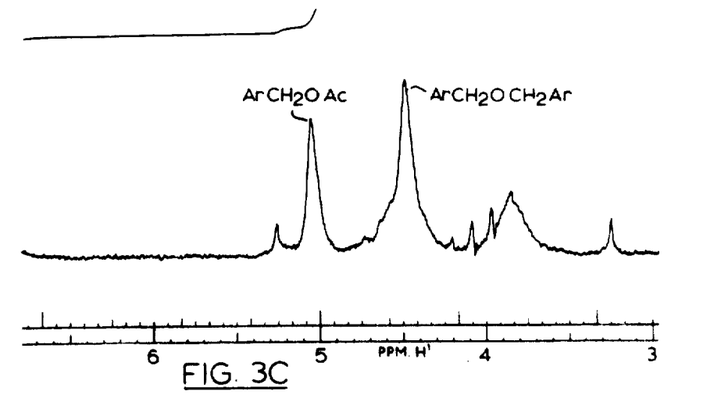

Additional evidence of the formation of a new phenolformaldehyde resin on addition of controlled quantities of acid to high vicosity resins prepared by the procedure of the Canadian Pat. No. 927,041 is obtained by the use of Nuclear Magnetic Resonance Spectroscopy (NMR). FIGS. 2A, 2B and 2C show the NMR spectra of the high viscosity resin prepared according to the procedure of the Canadian Pat. No. 927,041 and the spectra of the same resin 45 minutes and 24 hours after addition of 1% by weight of the resin of toluene sulfonic acid as a 50% aqueous solution thereof, the reaction being carried out at a room temperature of about 70° F. Corresponding spectra of the acetylated resins are given in FIGS. 3A, 3B and 3C. The absorptions attributed to various chemical groups are shown on the spectra.

An examination of the spectra shown in FIGS. 2A, 2B and 2C and FIGS. 3A, 3b and 3C clearly shows that the addition of small quantities of acid at or around room temperature leads to the formation of a new resin that, in its chemical structure, is quite different from the resins prepared by the procedure of the Canadian Pat. No. 927,041.

The rate at which the novel resin of the invention is formed depends upon the amount of acid added, the strength of acid used and the temperature. Thus, when 1% toluene sulfonic acid as a 50% solution in water is added to a high viscosity resin made according to the Canadian Pat. No. 927,041 and the acidified resin is maintained at room temperature (approximately 70° F) the decrease in the IR absorption band at 1010 cm$^{-1}$ is virtually complete in a matter of five minutes or less as shown by the IR spectra of FIG. 1. However, if half of this amount of acid is added, that is 0.5% of toluene sulfonic acid (as a 50% solution in water) and the mixture maintained at room temperature (approximately 70° F), there is no detectable change in the IR absorption band at 1010 cm$^{-1}$ even after 2 hours. If, however, the temperature of this mixture is raised to about 140° F, a decrease in the IR absorption band at 1010 cm$^{-1}$ is detectable within 1 hour and is virtually complete within 6 hours.

When more than 1.5% toluene sulfonic acid (as a 50% solution in water) is added to the high viscosity resin (made according to the Canadian Pat. No. 927,041), the novel resin of the invention is formed almost instantly. However, the addition of such a large quantity of acid renders the novel resin quite unstable. Within two hours, the acidified resin gels. This is presumably due to the further condensation of the methylol groups.

It is preferred, therefore, for the production of a room-temperature stable product having a variety of end uses that, (1) the quantity of acid used to convert the high viscosity resin made according to the Canadian Pat. No. 927,041 to the novel resin, and (2) the corresponding temperature of conversion and (3) subsequent storage, be carefully controlled. When toluene sulfonic acid is used, between 0.25 and 1.5% of this acid is used, preferably about 0.5 to about 1.0% of acid. When the smaller quantities of this acid are used, correspondingly higher temperatures are needed to form the novel resin within a resonable time. When acid amounts in excess of 1.5% are used, the acidified mixture must be neutralized as soon as the formation of the novel resin is complete, to prevent the novel resin from gelling due to subsequent cross-linking of methylol groups.

When acids other than toluene sulfonic acid are used, the quantity of acid required to form the novel resin may vary according to the inherent strength of the acid. Thus, when phosphoric acid is used 1% to 3% acid may be used to form the novel resin intermediate.

In some end uses of the novel resin of the invention, the acid addition may be delayed until after the initial resin has been applied due to the difficulties mentioned above in applying acid catalyzed resins at elevated temperatures to substrates. For example, in the production of composite boards from rice husks or wood chips, a high viscosity thermosetting phenol-formaldehyde resin provided in accordance with the procedure of Canadian Pat. No. 927,041 may be sprayed at an elevated temperature, or otherwise applied to the rice husks or wood chips, separately, and thereafter the required amount of acid is sprayed or otherwise applied. The materials may be applied in the reverse order, if desired. If such a case, the required amount of the novel resin is formed on the particles. If the quantity of acid added is not in excess of that required to form the novel resin, the coated particles may be stored for a prolonged period of several weeks. However, at any time the coated particles may be formed into a composite structure by the appropriate application of heat and pressure, with the addition of catalyzing quantities of acid, if desired.

The quantity of acid discussed above for formation of the novel resin is the quantity of acid actually contacting the resin. Thus, for example, this is the case when the acid or its solution is stirred directly into the initial resin. However, in such applications as the production of composite boards from rice husks or wood chips if the resin and the acid or acid solution are sprayed separately, not all the acid may contact the resin. This is also the case when, for example, the initial resin is used as an aqueous emulsion, and the acid is added to the emulsion. In such a case the majority of the acid remains in the aqueous phase and only a small percentage thereof actually contacts the resin. In such cases the minimum quantity of the acid required to form the new resin has to be specifically determined by utilizing the IR spectral band at 1010 cm$^{-1}$ and NMR-spectroscopy. The upper limit of the acid that can be used is more easily determined for, if the actual quantity of acid in the resin phase is too high, the novel resin is unstable, resulting in cross-linking and gelling within an hour or so of acid addition.

Another use for the new resin of the invention is in the manufacture of plywood or other lamina products containing at least one wood lamina or wood-paper composite products. Phenolic resins currently used in the manufacture of plywood are caustic aqueous solutions of phenol-formaldehyde resins. These resins perform as suitable adhesives only when water is present. In the absence of water, the sodium salt of the phenolic polymer has no flow even under heat and pressure. In the manufacture of plywood, immediately after adhesive application, water loss occus both through soaking into plywood and by evaporation into the air. Consequently the hot pressing of the plywood has to be completed very soon after the adhesive has been applied to individual pieces of veneer. This severe limitation in the use of thermosetting phenol-formaldehyde resins for plywood adhesive may be readily overcome by using the new resin of the present invention, which has a very long shelf life and good performance characteristics even in the absence of water.

An important aspect of the first embodiment of the present invention is the control of tack in phenol-formaldehyde resins which contain benzyl ether linkages ortho to the phenol hydroxyl group.

In most adhesive applications, whether natural adhesives, such as proteins and starches, or thermoplastic synthetic resins, such as polyvinyl acetate or neoprene-phenolic resin contact cements, or thermosetting synthetic resins, such as melamine formaldehyde, urea formaldehyde and phenol formaldehyde resins, are used, a very important requirement is the ability to control tack. In many applications, such as, shell molding sands and certain types of fiber and composite board operations, the presence of tack is very undesirable. On the other hand, in packaging and caulless particle board manufacture, tack is very desirable or even necessary. Therefore, the ability to control tack, so as to be able to use a thermosetting resin in a variety of applications is important.

The high viscosity thermosetting phenol-formaldehyde resins made according to the procedure of Canadian Pat. No. 927,041 at the mole ratio of formaldehyde to phenol of 1.5:1 exemplified therein normally are very tacky. The preparative procedure results in the presence of about 5 to 10% of free phenol in the resin and, since phenol is a good solvent for this resin, its presence tends to depress the melting point (otherwise known as the "glass transition temperature") of the resins, thereby rendering them tacky at room temperature.

It is mentioned above that the conversion of the resin of Canadian Pat. No. 927,041 to the novel resin of the present invention leads to the loss of hemi-formal groups and a decrease or disappearance of free phenol in the mixture. Because of the combined effect of these two chemical changes, the novel resin of the invention is substantially tack free. Since, however, the lack of tack in the novel resin is due to the absence of a solvent, such as phenol, the tack may be regenerated at will by the addition of small quantities of a suitable solvent, such as phenol or benzyl alcohol.

The tack may be restored to the novel resin of this embodiment of the invention by heating the resin to a temperature above its glass transition temperature but below its cure temperature. Typically, this temperature may lie in the range of about 100° to 300° F, the degree of tack increasing with temperature. The tack of the novel resin, therefore, may be controlled by the use of solvent or elevated temperatures, or a combination of the two. It is less preferred to control tack by the use of temperature when it is proposed to store the tacky resin, since at elevated temperatures, the novel resin is less stable than at normal room temperatures around 70° F.

The tack-free novel phenol-formaldehyde resin of this embodiment of the present invention is stable over long periods of time when stored at temperatures below those above which curing occurs, and hence are usable in various adhesive applications even after prolonged storage. The novel resins, however, cure rapidly on heating to elevated temperatures, especially in the presence of additional quantities of acid curing catalyst.

Figure 4:
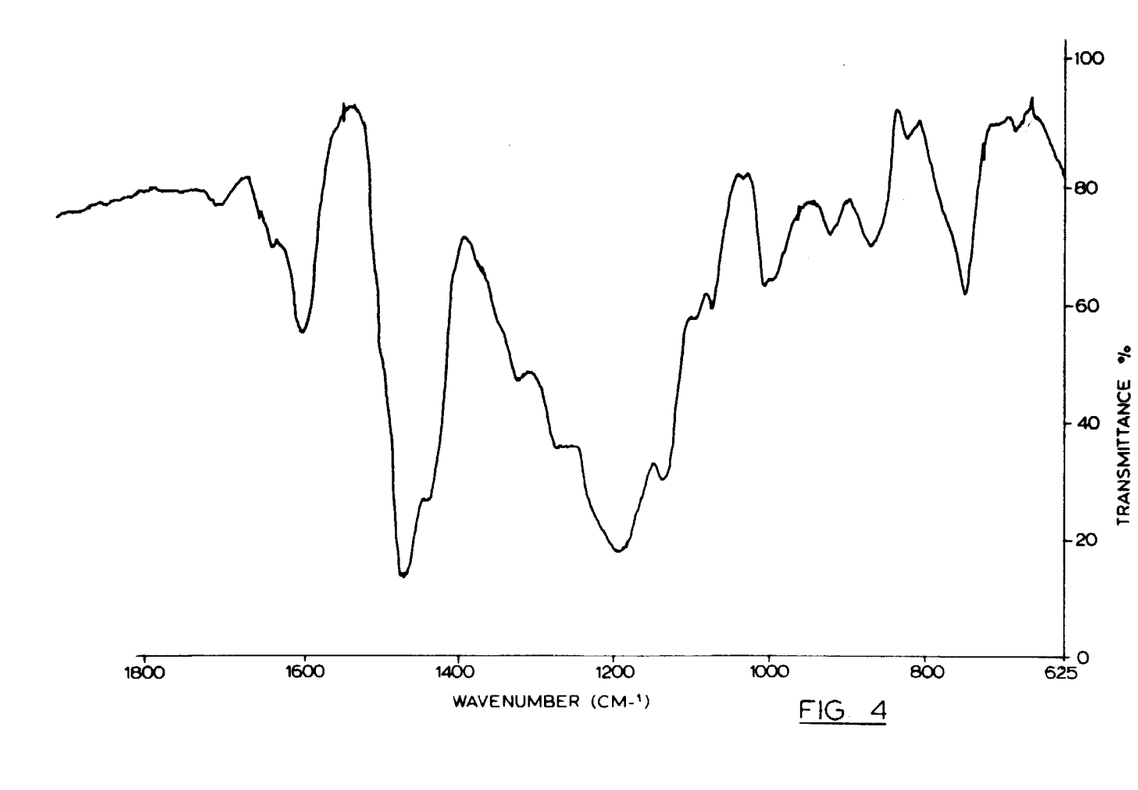
FIG. 4 shows an infra-red spectrum of a fully cured resin formed from acid-added resins.

The production of the novel resin of the invention by the procedure described above represents a totally different reaction from that leading to its cure on subsequent application of heat. On the application of heat, the dibenzyl ether linkages break or rearrange to form methylene linkages. This may be seen from the IR spectrum shown in FIG. 4 of the cured resin produced by curing at 390° for 5 minutes, where the dibenzyl ether absorption band at 1060 cm$^{-1}$ previously present has completely disappeared. The IR spectrum of FIG. 4 also shows the appearance of substitution at the para position, indicated by increased absorbance at 870 cm$^{-1}$ and decreased absorbance at 740 cm$^{-1}$ providing additional evidence of cross-linking.

The conversion of the high viscosity resins made according to the procedure of Canadian Pat. No. 927,041 into a novel resin in accordance with the present invention gives rise to many advantages in industrial usage that are not obtainable with the original resin. The acid catalyst may for example, be applied at the same time as the resin in certain applications without undue loss of storage stability and with the added advantage of fast cure rates on application of heat. This provides considerable flexibility in industrial operations, a flexibility that is presently not available with low cost, one component thermosetting resins. Additionally, the tack of the initial resin may be controlled at will from no tack to a tacky system, by controlling the proportion of the novel resin intermediate which is formed, or by controlling the proportion of free solvent which is present.

As mentioned previously, the high viscosity resins need to be heated for many adhesive applications, leading to the necessity to apply the resin and acid curing catalyst separately to the substrate.

In accordance with the second embodiment of the invention a resin formed at a mole ratio of formaldehyde to phenol greater than 1.7:1 has a lower room temperature viscosity, typically about 1000 to 40,000 cps at 75° F, and may be acid catalyzed to a mobile room-temperature stable resin which can be room temperature applied to the substrate and subsequently rapidly cured at an elevated temperature. The quantity of acid catalyst required for adequate curing of the resin is considerably decreased, typically to about 1/6th to 1/10th of that required when the resin and catalyst are applied separately, thereby leading to more economic utilization of materials and a vastly improved product appearance, especially in rice husk board production.

Additionally, resins prepared using mole ratios of formaldehyde to phenol of greater than 1.7:1 require a viscosity of about 1000 cps or more at 75° F to perform as satisfactory adhesives for rice husk boards.

One aspect of this second embodiment of the present invention, therefore, provides a room temperature-stable acid-catalyzed and mobile thermosetting phenol-formaldehyde resin capable of rapid cure at elevated temperature, formed by reaction of formaldehyde and phenol in an aqueous reaction medium at a mole ratio of formaldehyde to phenol of greater than about 1.7:1 and having a viscosity of from about 1000 to about 40,000 cps at about 75° F.

The resins provided by this second embodiment of the invention and formed from a mole ratio of formaldehyde to phenol greater than about 1.7:1 may be used in a variety of useful adhesive applications. For example, the resins may be used in various spray applications, such as rice husk board and particle board production. The resins also may be used in paper lamination, foundry core applications, wood straw board and rye grass board production, and plywood production.

In cold set foundry applications for making core moulds, phenolic resins are commonly used. The resins used, however, are not the conventional resole-type resins but are generally modified with expensive and scarcely-available chemicals, such as furfuryl alcohol and silanes. It was surprising to find that the resins of this embodiment of the present invention, while being very stable in the presence of small quantities of acid-catalysts, react rather rapidly at acid levels of about 20 percent or more and are quite suitable for cold set, room temperature cure type applications.

A further surprising property of the resins provided by this second embodiment of the invention is the ability of these resins to cure under the influence of radio frequency. Radio frequency, for example, is commonly used where faster production cycles are required. Typical examples are scarf and end joining and preheating of mats in panel board manufacture. The conventional caustic-containing phenolic resins, however, are not suitable for these applications as they are very heavily under the influence of the high frequency energy and tend to precure. More sophisticated resins, such as the resorcinol-modified resins catalyzed with para-formaldehyde are suitable for use under radio frequency. Such resins are not only prohibitively expensive but have very poor pot life.

However, when the resins of this second embodiment of the invention, produced from mole ratios of formaldehyde to phenol of at least 1.7:1 are used in plywood manufacture with radio frequency preheating, considerable benefits in production cycles are derived.

The resins of this second embodiment of the invention preferably are formed by a one-step process in which phenol and formaldehyde are reacted in quantities such that the mole ratio of formaldehyde to phenol exceeds about 1.7:1, in an aqueous reaction medium containing a metal carboxylate catalyst for the reaction, for example, zinc acetate, wholly at a temperature above about 90° C, as described in more detail in copending application Ser. No. 567,865 filed Apr. 14, 1975.

The resin formed by this latter procedure exhibits large absorption at wave numbers of 1230 cm$^{-1}$, 1060 cm$^{-1}$ and 1030 cm$^{-1}$. Upon addition of at least one strong acid to this resin, there results a decrease of at least 5% in the absorption at a wave number of 1060 cm$^{-1}$ and an increase of at least 5% in the absorption at a wave number of 1030 cm$^{-1}$ while leaving substantially unaffected the absorption at a wave number of 1230 cm$^{-1}$. The latter thermosetting resin may be isolated.

EXAMPLES

EXAMPLE 1

This example illustrates the preparation of a phenol-formaldehyde resin an accordance with the first embodiment of the invention.

A resin was prepared following the two-step procedure of Example 1 of Canadian Pat. No. 927,041 using a mole ratio of formaldehyde to phenol of about 1.6:1 and then prolonging the second step to provide a high viscosity resin. An infra-red absorption spectrum for this resin was obtained. Toluene sulfonic acid, 0.5% based upon the resin weight using a 50% solution in water, was then added to the resin, and the infra-red absorption spectra obtained at various times after the acid addition were obtained.

The absorbance values at wave numbers 1010 cm$^{-1}$ (using a base line drawn between 950 cm$^{-1}$ and 1030 cm$^{-1}$) and at 1230 cm$^{-1}$ (using a base line drawn between 1130 cm$^{-1}$ and 1310 cm$^{-1}$) were calculated. The results obtained are set forth in Table I below:

TABLE I

| | Absorbance Ratio 1010 cm$^{-1}$/1230 cm$^{-1}$ | | | |
|---|---|---|---|---|
| HCHO to Phenol mole ratio used | Before Acid Addition | After Acid Addition* | Time After Acid Addition (mins) | % Decrease |
| 1.6 | 0.19 | 0.04 | 5 | 79 |
| | | 0.07 | 135 | 63 |

*Because of very small residual absorption at 1010 cm$^{-1}$ after acid addition, these determinations can only be of an order of magnitude and have an inherent limit of accuracy.

The resin after acid addition was placed on a hot plate at 350° F. The resin melted and soon therefter set to an infusible brittle mass.

EXAMPLE 2

This example illustrates the control of tack when the resin provided by the procedure of Example 1 is used as a binder on non-porous substrates such as sands used in sheel molding in foundry practice.

A resin was made according to the two-step procedure outlined in Canadian Pat. No. 927,041. This resin was used to coat foundry sand and the quantity of resin used was 3% by weight of sand. Two product samples were prepared as follows:

a. A resin with a viscosity of over 60 Kreb units at 120° F and having a resin solids content of 82% was coated on warm sand having a temperature of about 120° F by rubbing. The sand was cooled and stored at room temperature.

b. A resin with a viscosity of over 60 Kreb units at 120° F and having a resin solids content of 82% first was modified by the addition of 0.5% toluene sulfonic acid (as a 50% solution in water) in accordance with the first embodiment of the invention and then coated on warm sand having a temperature of about 120° F by rubbing. The sand was cooled and stored at room temperature.

c. A resin with a viscosity of over 60 Kreb units and having a resin solid content of 82% first was modified by the addition of 4% toluene sulfonic acid (added as a 50% aqueous solution thereof) and then coated on warm sand having a temperature of about 120° F by rubbing. The sand was cooled and stored at room temperature.

The samples (a), (b) and (c) were periodically examined. At the end of 24 hours the sample (a) was still tacky, whereas samples (b) and (c) were quite dry and free-flowing.

After 24 hours storage, all three samples of coated sand, samples (a), (b) and (c), were used to form standard foundry dog bones by air blowing into the hot mold. Sample (a) gave a dog bone that had very poor strength characteristics, while sample (b) gave very acceptable specimens. On examination, it was found that sample (a) did not fill the mold completely, presumably because the sand was tacky and not free-flowing, in contrast to sample (b), which was free-flowing.

Sample (c) failed to bind at all, although the individual sand particles changed to a dark brown color showing precure of resin in the presence of the large quantity of acid.

EXAMPLE 3

This example illustrates the use of the novel resin of the first embodiment of the present invention in composite board manufacture.

A resin having a viscosity of over 100 Kreb units at 120° F was prepared using the two-step procedure of Canadian Pat. No. 927,041 at a mole ratio of formaldehyde to phenol of 1.6 to 1. Three product samples were prepared utilizing this resin, as follows:

a. The resin was coated on rice husks in a qunantity of 10% by weight of husk.

b. The resin, after addition of 3% by weight of toluene sulfonic acid thereto, (as a 50% aqueous solution thereof), was coated on rice husk in a quantity of 10% by weight of husk.

c. The resin, after addition of 0.5% by weight of toluene sulfonic acid thereto (as a 50% aqueous solution thereof), was coated on rice husk in a quantity of 10% by weight of husk.

Samples (a), (b) and (c) were examined periodically. It was found that all three samples were quite takcy when freshly coated. Sample (a) became tack-free after 24 hours due to absorption of the free phenol by the rice husks, sample (b) became tack-free after 2 hours and sample (c) became tack-free after 6 hours.

The tack on samples (a) and (c) could be regenerated by addition of 1% phenol (based upon husk weight) or benzyl alcohol.

It is concluded, therefore, that the disappearance of tack is due to the loss of the low molecular weight components, which in turn raises its melting point. In the case of sample (a), the loss of molecular weight components occurs by absorption into the porous husks, whereas in the case of samples (b) and (c) the loss of the low molecular weight components occurs both by absorption and chemical reaction. It was also found in the case of samples (a) and (c), the tack may be partially restored by warming the resin coated husk to slightly above the ambient temperature.

After 24 hours, the coated husk from all three samples was formed into individual mats and hot pressed for 8, 10, 12, 14 and 16 minutes each. Boards, 5/8 inches thick and 50 lbs/ft$^3$ in density were made using a press temperature of 390° F.

Sample (a) required sixteen minutes to form a good board. Sample (b) did not give a good board under any of the conditions used. Sample (c) gave a good board at 10 minutes press time.

The experiment was repeated with sample (b), except that this time the boards were hot pressed immediately after coating the resin onto the husk. A good board was made at 10 minutes press time.

The above examples 1 to 3 illustrate how, under different application conditions, acid addition, resin viscosity and substrate characteristics can be judiciously combined to control tack and other performance characteristics. The discovery of the fact in accordance with the first embodiment of the invention, that the resin made according to the procedure disclosed in Canadian Pat. No. 927,041 does not cure on the addition of small quantity of acids at room temperature, but simply changes to another new form, still retaining the thermosetting character, cannot only be used to reduce tack by acid additon, as in the case of shell molding, but also enables one to introduce tack by the addition of phenol or solvents, as in the case of wood chips and rice husks.

It should be emphasized that the invention claimed should not be considered to be restricted in use to controlling tack in shell molding and in composite boards. These examples, are merely illustrations to describe the scope of the invention on both porous and non-porous substrates, where control of tack along with other desirable characteristics such as storage stability and fast cure is required.

EXAMPLE 4

This example illustrates the formation of a phenol-formaldehyde resin of the second embodiment of the present invention by a one-step procedure.

Into a glass reaction vessel equipped with an agitator, a reflux condenser and a thermometer was charged 1794.1 g (19.09 moles) of phenol, 2788.3 g (34.35 moles) of formaldehyde having a methanol content of less than 1.5 wt.% (corresponding to a formaldehyde to phenol mole ratio of 1.8:1), 144.8 g (0.034 moles and about 8 wt.% is based on phenol) of zinc acetate dihydrate and 772.8 g of water, to provide a reaction mixture having a total reactants loading of 54.01%.

The mixture was heated rapidly to 90° ± 2° C in 40± 5 minutes. The temperature was raised further to reflux, (approximately 100° C) over the next 15 minutes by controlling the rate of heating. The reaction mixture was kept under constant reflux for a total time of 210 minutes. About 105 minutes after commencement of the reflux began, a distinct phase separation was observed.

After completion of the reflux period, the reaction mixture was cooled to 35° C and the agitation stopped. Cooling then was continued to about 25° C. The liquid resin phase was separated from aqueous phase. The resin was found to have a Brookfield viscosity of 2000 to 2300 cps at 120° F and a N.V. solids content of 75 to 80 percent.

EXAMPLE 5

This example illustrates the different structures obtained when resins are formed from different mole ratios of formaldehyde to phenol.

A series of phenol-formaldehyde resins was prepared following the procedure of Example 4 using varying mole ratios of formaldehyde to phenol. An infra-red spectrum was taken for each resin.

Figure 5:
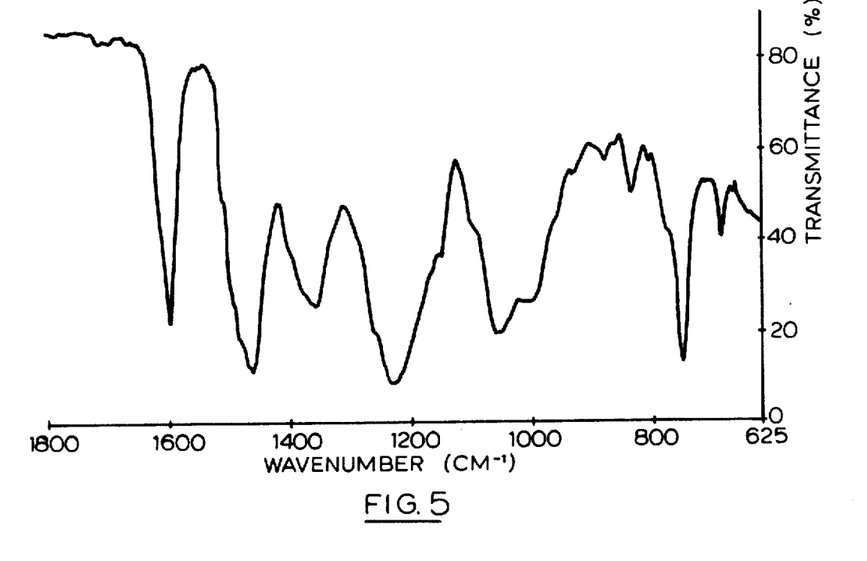
Figure 6:
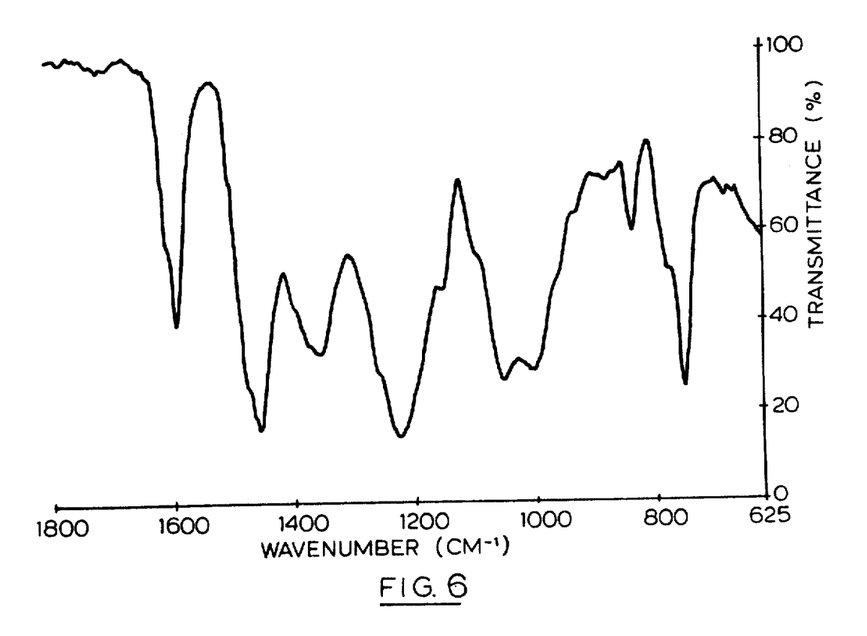
Figure 7:
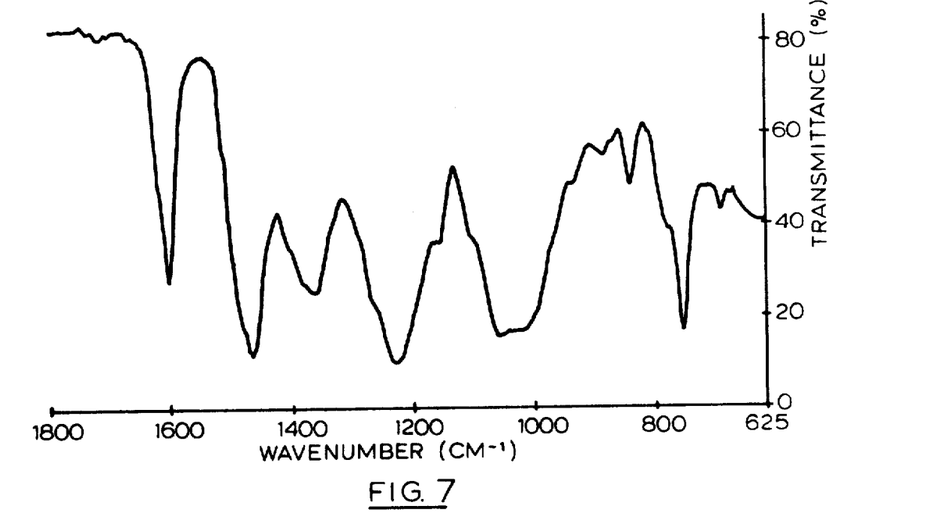
Figure 8:
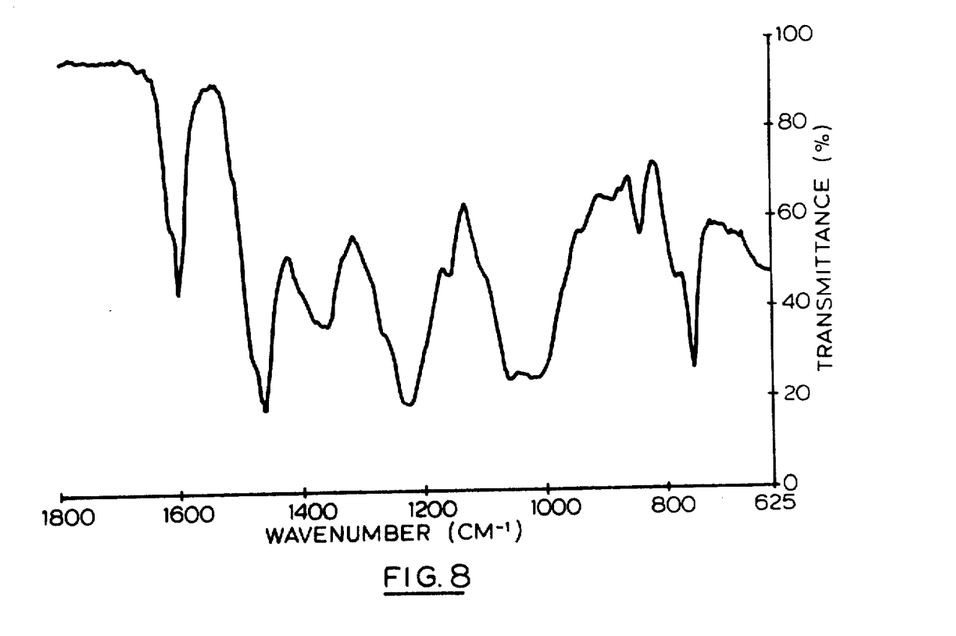
Figure 9:
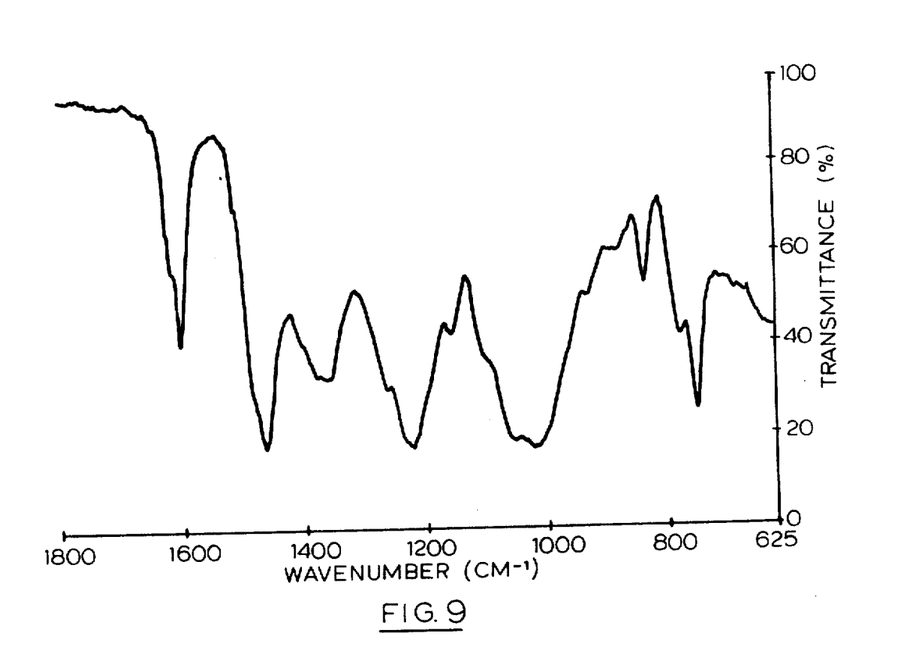
Figure 10:
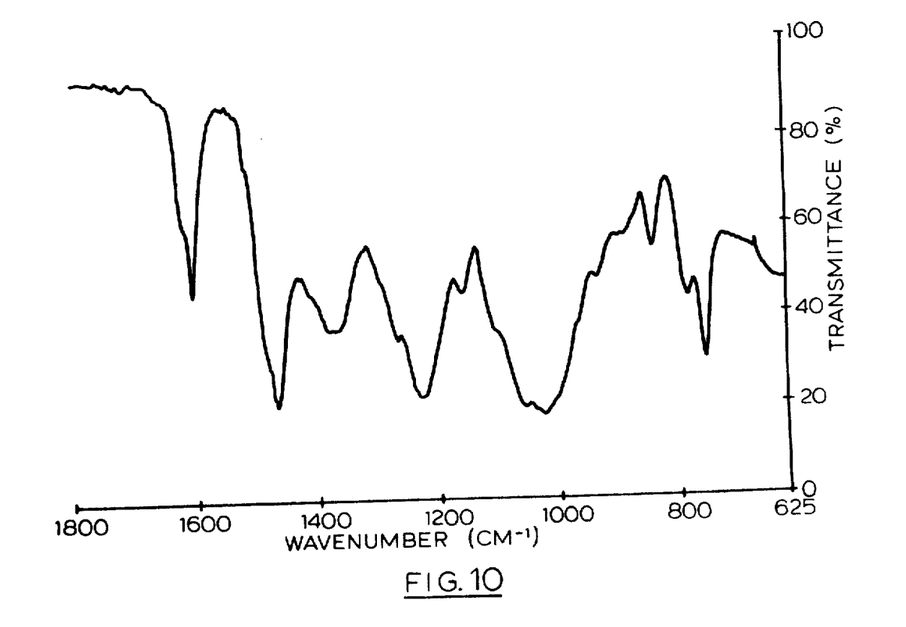
Figure 11:
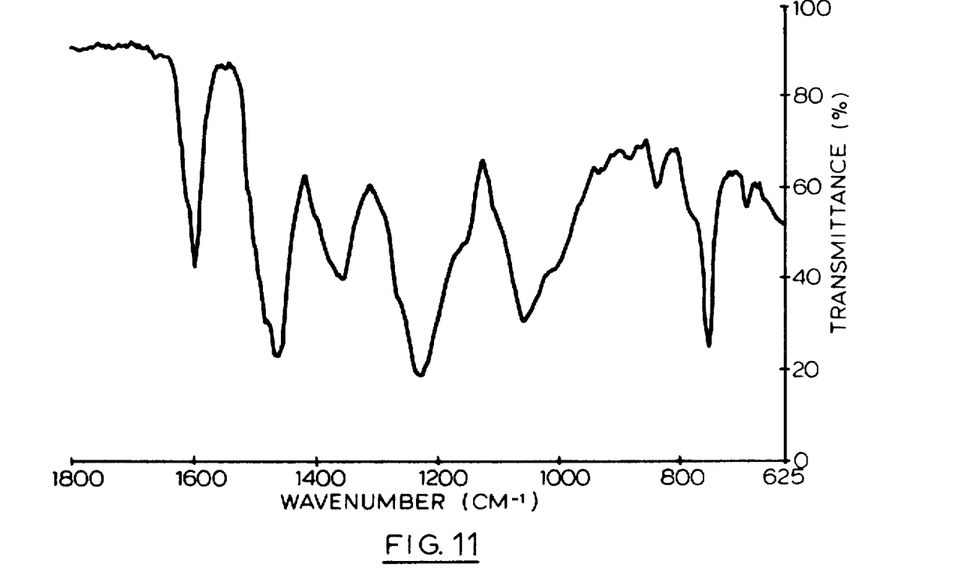
Figure 12:
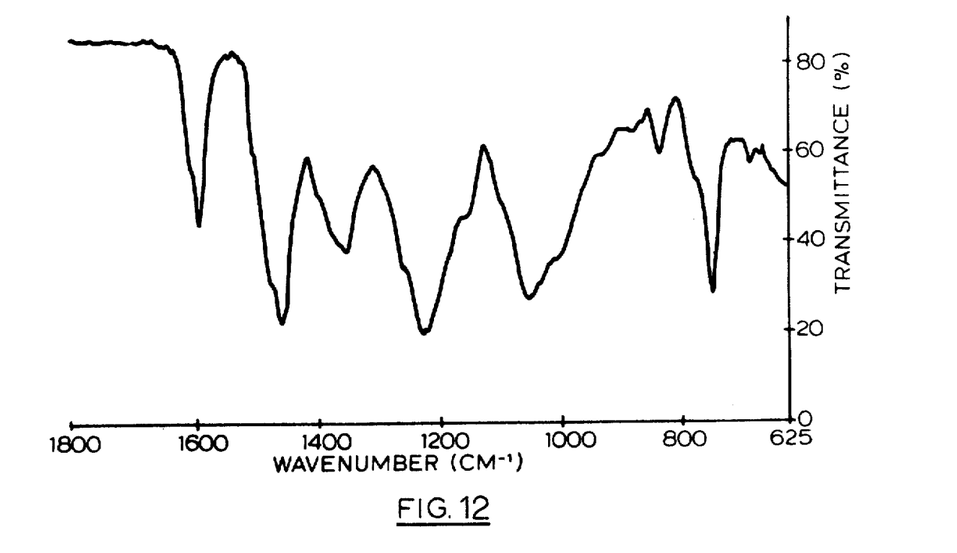
Figure 13:
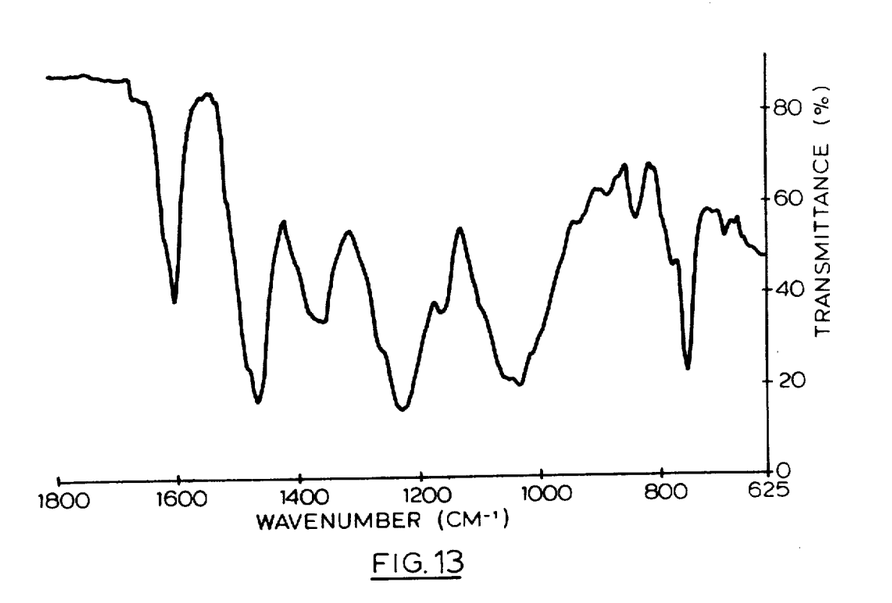
Figure 14:
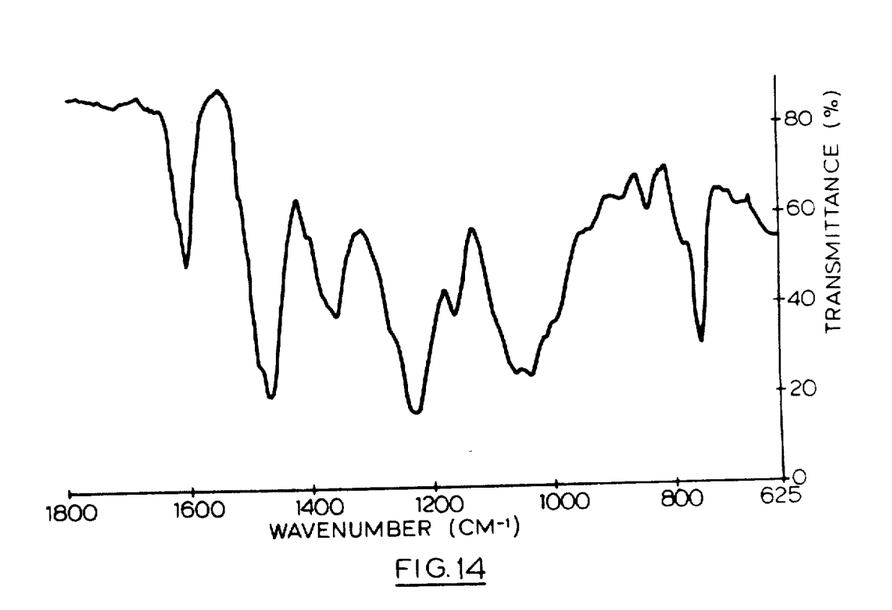
Figure 15:
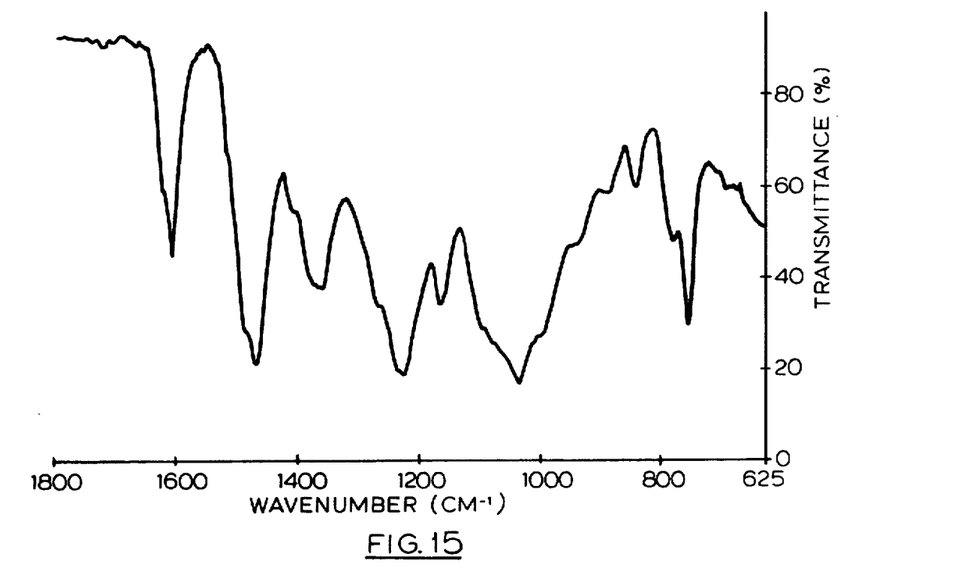
Figure 16:
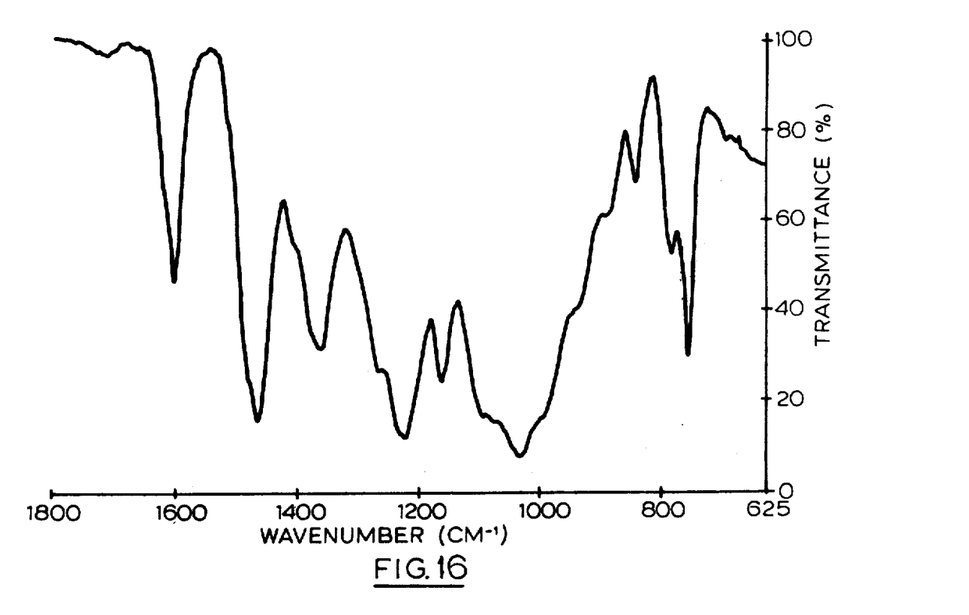

To a sample of each resin was added 1% para toluene sulfonic acid (used as a 50% aqueous solution) and the infra-red spectrum again taken. The two sets of spectra appear as FIGS. 5 to 16, identified as follows:

| | | |
|---|---|---|
| Figure 5 | Mole ratio 1.4:1 | No acid |
| Figure 6 | Mole ratio 1.6:1 | No acid |
| Figure 7 | Mole ratio 1.8:1 | No acid |
| Figure 8 | Mole ratio 2.0:1 | No acid |
| Figure 9 | Mole ratio 2.5:1 | No acid |
| Figure 10 | Mole ratio 3.0:1 | No acid |
| Figure 11 | Mole ratio 1.4:1 | Acid Added |
| Figure 12 | Mole ratio 1.6:1 | Acid Added |
| Figure 13 | Mole ratio 1.8:1 | Acid Added |
| Figure 14 | Mole ratio 2.0:1 | Acid Added |
| Figure 15 | Mole ratio 2.5:1 | Acid Added |
| Figure 16 | Mole ratio 3.0:1 | Acid Added |

It will be seen from a comparison of the spectra of the resins both before and after acid addition that there is a clear strong absorption peak at a wave number of 1030 cm$^{-1}$ in the spectra of the 1.8:1 and above mole ratio resins whereas this peak is absent from the spectra of the 1.4:1 and 1.6:1 mole ratio resins.

Further, a comparison can be made between the ratios of absorption at a wave number of 1030 cm$^{-1}$, measured from a base line drawn between wave numbers 1130 cm$^{-1}$ and 950 cm$^{-1}$, to that at a wave number of 1230 cm$^{-1}$, measured from a base line between wave numbers of 1130 cm$^{-1}$ and 1310 cm$^{-1}$.

Analysis of the spectra of the 1.8:1 and above mole ratio materials reveals that prior to acid addition there is also a large absorption at a wave number of 1060 cm$^{-1}$, and after acid addition, there is a decrease in the absorption at a wave number of 1060 cm$^{-1}$ and an increase in adsorption at a wave number of 1030 cm$^{-1}$. In the case of the 1.6:1 and below mole ratio resins, the adsorption at a wave number of 1060 cm$^{-1}$ increases.

The following Table II provides the appropriate comparisons:

TABLE II

| | Ratio 1060/1230 cm$^{-1}$ | | | Ratio 1030/1230 cm$^{-1}$ | | |
|---|---|---|---|---|---|---|
| Mole Ratio | Before Acid Addition | After Acid Addition | % Change | Before Acid Addition | After Acid Addition | % Change |
| 1.4:1 | 0.572 | 0.642 | +12.3 | 0.383 | 0.443 | +15.7 (1) |
| 1.6:1 | 0.684 | 0.724 | +5.9 | 0.596 | 0.488 | −18.2 (1) |
| 1.8:1 | 0.770 | 0.634 | −17.7 | 0.705 | 0.783 | +11.1 |
| 2.0:1 | 0.814 | 0.733 | −10.0 | 0.797 | 0.899 | +12.8 |
| 2.5:1 | 0.929 | 0.724 | −22.1 | 0.612 | 1.044 | +70.6 |
| 3.0:1 | 1.043 | 0.690 | −33.8 | 1.077 | 1.146 | +6.4 |

Note: (1) There is no peak as such at 1030 cm$^{-1}$ in these resins.

It will be seen from the above Table II that the resins of mole ratio 1.8:1 and above not only have a distinct peak at a wave number of 1030 cm$^{-1}$ but also a ratio of absorbance to that at a wave number of 1230 cm$^{-1}$ greater than about 0.6, both before and after acid addition, whereas resins of mole ratio 1.6:1 and below not only do not exhibit such a peak at a wave number of 1030 cm$^{-1}$ but also have a ratio of absorbance to that at a wave number of 1230 cm$^{-1}$ less than 0.6, both before and after acid addition.

EXAMPLE 6

This example illustrates the physical properties of phenol-formaldehyde resins formed at various mole ratios of phenol to formaldehyde.

A series of phenol-formaldehyde resins were prepared following the procedure of Example 4. Various properties of the resins were tested and the results are reproduced in the following Table III:

The results of the above Table III indicate the decreasing viscosity of the resins at mole ratios of 1.8:1 and above, the decreasing electrical resistance of the resins at mole ratios of 1.8:1 and above, the rapidly-decreasing cure times of acid catalyzed curings with increasing mole ratio and the ability to emulsify the resins at mole ratios of 1.5:1 and above.

The results of the above Table III also show that, contrary to the expectation of one practising this art, the electrical properties of the resins and the change in electrical properties of the resins after acid addition are independent of the viscosity of the resin.

EXAMPLE 7

This example illustrates the formation of rice husk board from acid catalyzed resins.

A 75% solids resin formed by the procedure of Example 4 and having a mole ratio of formaldehyde to phenol of 1.6:1 was catalyzed with 0.5% by weight of para-toluene sulfonic acid (used as a 50% solution) and was found to be stable at room temperature for over 24 hours. The resin, however, was incapable of being sprayed at room temperature due to its inherent viscosity (>50,000 cps at room temperature) and consequently had to be warmed to 160° F for use. At this temperature, the resin gained viscosity rapidly and hence could not be spray applied to the rice husks.

The resin and acid catalyst, however, were capable of being satisfactorily applied to the rice husks as separate components. The acid first was sprayed onto samples of cleaned rice husks at levels of 4% and 8% based on resin weight. Thereafter, the resin was hot melt sprayed at 150° F onto the rice husks samples, in both cases at a resin solids level of 10% based on husks. The resin coated husks were laid into mats, consolidated and then pressed in a hot press at 390° F for a period of 11 minutes.

An equivalent 75% solids resin formed by the procedure of Example 4 and having a mole ratio of formaldehyde to phenol of 1.8:1, after catalyzing with 0.5% by weight of para-toluene sulfonic acid (used as a 50%

TABLE III

| Loaded P:F Mole Ratio | Solids Content % | Viscosity | | Gardner Tube 75 ± 2° F | Electrical Properties ohms at 75 ± 5° F | | Times[2] Seconds | Gel Emulsion[4] Formation |
|---|---|---|---|---|---|---|---|---|
| | | Brookfield 75 ± 2° F | Cps 120 ± 2° F | | Control | Catalyzed | | |
| 1:1.2 | 72.5 | High Viscosity | 1,880 | >Z − 6 | 13,000,000 | 300,000 | 12 | Did not emulsify |
| 1:1.4 | 72.2 | High Viscosity | 4,350 | >Z − 6 | 15,000,000 | 350,000 | 22 | " |
| 1:1.5 | 62.5 | High Vicosity | 8,900 | >Z − 5 | 2,100,000 | 550,000 | 40 | Emulsified |
| 1:1.8 | 75.9 | 34,500 | 2,300 | >Z − 6 | 950,000 | 100,000 | 37 | Emulsified |
| 1:2.0 | 80.5 | 11,000 | 590 | >Z − 6 | 370,000 | 18,000 | 22 | Emulsified |
| 1:2.5 | 77.7 | 2,200 | 240 | Z − Z+ | 130,000 | 4,000 | 13 | Emulsified |
| 1:3.0 | 75.8 | 1,400 | 130 | x | 80,000 | 1,200 | 12 | Emulsified |
| 1:3.0 delayed[3] feed | 77.5 | 1,260 | 195 | x | | | 12 | Emulsified |

Notes:
[1]All resins catalyzed with 1% PTSA (used as a 50% solution in water)
[2]Gel times on resins catalyzed with 1% PTSA (used as a 50% solution in water) All values recorded are average of three. All gel times carried out on a hot press platten surface maintained at 400° F.
[3]Resin was originally started at 1.8MR with additional 1.2M added later over a period of 1 hour starting 20 minutes after reflux.
[4]Emulsification was attempted with equal weights of resin and a 1% hydroxyethyl cellulose thickener solution.

aqueous solution), was found to be stable at room temperature for prolonged periods of over a week. The catalyzed resin was found to be sprayable at room temperature and near ambient temperatures of 80° to 90° F aand rice husk boards were formed by spraying the cleaned husks with 10% of the acid catalyzed resin, followed by the mat formation, consolidation and hot pressing as outlined above. The resultant board of ½ inch thickness and 48 lb/ft³ density was very light in colour, in contrast to the typical rice husk boards formed from the two-component system which were quite dark in colour.

Similar rice husk boards were formed from one-component systems using resins at other mole ratios above 1.7:1.

The strength properties of the boards were determined and the results appear in the following Table IV:

TABLE IV

| Type of Application | Mole Ratio | Catalyst Level % | Internal Bond Strength psi | Modulus of Rupture psi |
|---|---|---|---|---|
| Two-component | 1.6:1 | 4 |  | Delaminated |
| Two-component | 1.6:1 | 8 | 75 | 1900 |
| One-component | 1.8:1 | 1 | 90 | 2100 |
| One-component | 2.0:1 | 1 | 108 | — |
| One-component | 2.5:1 | 1 | 76 | — |
| One-component | 3.0:1 | 1 | 55 | — |
| One-component | 3.0:1* | 1 | 57 | — |

*Deferred feed

The results of the above Table IV clearly demonstrate that the ability of a 1.8:1 mole ratio resin to be used in a one-component spray application leads to the production of good quality rice husk boards with improved appearance and considerably lower catalyst levels than are required when a 1.6:1 mole ratio resin is applied in a two-component spraying procedure, the latter procedure being adopted due to the inability of the 1.6:1 mole ratio to be sprayed as a single component in a commercially-feasible manner.

The results of the above Table IV also demonstrate that good quality rice husk boards can be formed even from the very low viscosity resins provided at mole ratio of 3.0:1. It has already been demonstrated in our U.S. Pat. No. 3,850,677 that resins of 1.6:1 mole ratio of low viscosity at room temperature are not suitable for the manufacture of rice husk boards. The latter low viscosity resins typically are prepared by the two-step procedure outlined in Canadian Pat. No. 927,041 at mole ratios of about 1.5:1.

EXAMPLE 8

This example illustrates the use of various phenol-formaldehyde resins in cold set foundry sand applications.

Sand was coated with 1.5% by weight of resin and varying amounts of catalyst levels by tumbling the mix in a tumbler. Cylindrical molding forms were made in a mold and allowed to dry under ambient temperature conditions. The forms were tested at various intervals for strength properties.

The results are reproduced in the following Table V along with comparative data on commercially-available resins:

TABLE V

| Resin-type | Example 4 | | | | DYNO S354 * | | DYNO L355 * | |
|---|---|---|---|---|---|---|---|---|
| Sand | 1000 | 1000 | 1000 | 1000 | 1000 | 1000 | 1000 | 1000 |
| Resin | 15 | 15 | 15 | 28.2 | 15 | 15 | 15 | 15 |
| Catalyst | 3.0 | 4.2 | 6.0 | 6.0 | 4.2 | 6.0 | 4.2 | 6.0 |
|  | (85% PTSA) | (85% PTSA) | (85% PTSA) | (85% PTSA) |  |  | (85% H$_3$PO$_4$) | (85% H$_3$PO$_4$) |
| Time (hrs.) ¼ | 0.29 | 0.64 | 0.44 | 0.20 | 7.0 | 6.1 | 0.25 | 0.75 |
| ½ | 1.58 | 2.8 | 2.20 | 1.45 | 14.5 | 8.85 | 0.95 | 8.00 |
| 1 | 6.30 | 13.2 | 4.20 | 8.0 | 18.5 | 12 | 3.50 | 15 |
| 2 | 13.50 | 15.8 | 14.50 | 16.00 | 25 | 18 | 13.50 | 30 |
| 4 | 20.00 | 26 | 18.50 | 33.0 | 28 | 34 | 29 | 34 |
| 24 | 29.00 | 43 | 34 | 54 | 66 | 36 | 39 | 52 |
| Resin solids % (N.V.) | 75.0 | 75.0 | 75.0 | Karl Fisher | 80% based on Karl Fisher ~ 20% F.F.A. | | 80% based on ~ 20% F.F.A. | |

* Dyno Industries Ltd., Oslo, Norway

The results of the above Table V indicate the suitability of the resins of mole ratio of 1.8:1 in cold foundry sand application. These results are in contrast to experiments conducted with resins formed at a mole ratio of 1.6:1 which showed that similar moulding forms could not be made at the catalyst levels of 20% or more outlined in Table IV. Considerable precure occurred and the resulting moulding forms lacked strength and integrity.

SUMMARY

The present invention, therefore, provides novel phenol-formaldehyde thermosetting resins having distinctive infra-red spectra and which are rapidly curable to a thermoset stage. Certain of the resins have superior adhesive properties in many applications. Modifications are possible within the scope of the invention.

What we claim is:

1. A room temperature-stable, acid-catalyzed and mobile thermosetting phenol-formaldehyde resin capable of rapid cure at elevated temperature, formed by reaction of formaldehyde and phenol in an aqueous reaction medium in the presence of a metal carboxylate catalyst therefor at a mole ratio of formaldehyde to phenol of greater than about 1.7:1 and acid catalysis of the resin so formed, and having a viscosity of about 1000 to 40,000 cps at 75° F.

2. The resin of claim 1 wherein said mole ratio is from about 1.8:1 to about 3.0:1.

3. A method for the production of a room temperature-stable, mobile thermosetting phenol-formaldehyde resin capable of rapid cure at elevated temperature which comprises:

reacting phenol and formaldehyde together in a mole ratio of formaldehyde to phenol greater than about 1.7 to 1 in an aqueous medium in the presence of a water-soluble metal carboxylate catalyst therefor to form a thermosetting phenolformaldehyde resin having benzyl ether linkages ortho to the phenolic hydroxyl group and an infra red spectrum which displays large absorption at wave numbers of 1230 cm$^{-1}$, 1060 cm$^{-1}$ and 1030$^{-1}$ cm, reacting said resin with at least one strong acid to cause a decrease of at least 5% in said absorption at wave number of 1060 cm$^{-1}$ and an increase of at least 5% in said absorption at wave number of 1030 cm$^{-1}$ while leaving substantially unaffected said absorption at wave number of 1230 cm$^{-1}$, and isolating the phenol-formaldehyde resin so formed.

4. The method of claim 3 wherein said phenol and formaldehyde are reacted together in a single step carried out wholly at a temperature above about 90° C.

5. The method of claim 3 wherein said strong acid is para-toluene sulfonic acid.

* * * * *